Sept. 7, 1937.    L. M. PERSONS    2,092,327
ANTICIPATING ROOM THERMOSTAT
Filed April 29, 1935
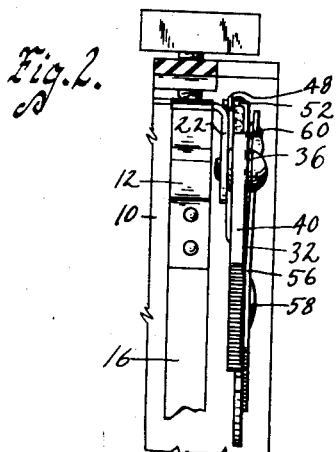
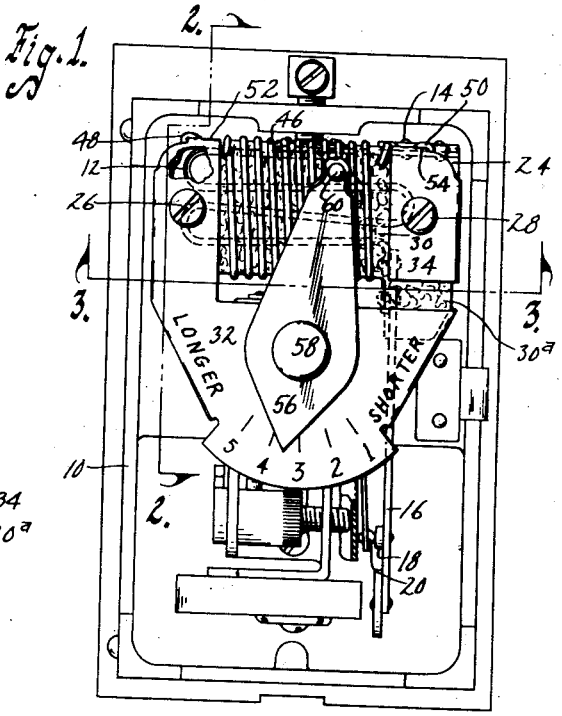
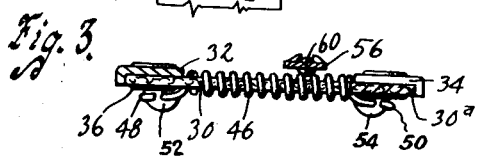
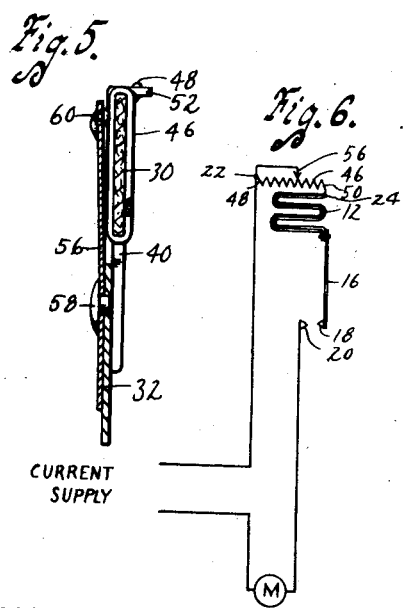
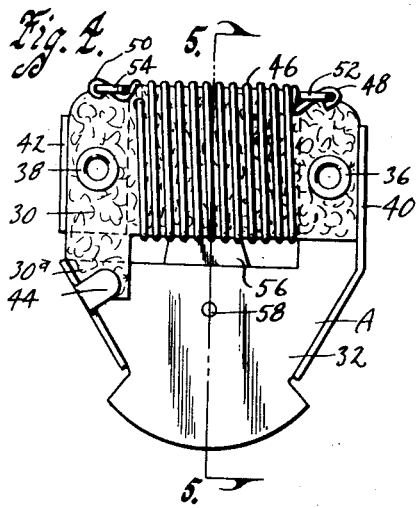
Inventor
Lawrence M. Persons
By Bair, Freeman & Sinclair
Attorneys
Witness
H. S. Menzenmaier Patented Sept. 7, 1937

2,092,327

UNITED STATES PATENT OFFICE 2,092,327

ANTICIPATING ROOM THERMOSTAT

Lawrence M. Persons, Des Moines, Iowa, assignor to Penn Electric Switch Co., Des Moines, Iowa, a corporation of Iowa Application April 29, 1935, Serial No. 18,744

3 Claims. (Cl. 200—122)

An object of my invention is to provide a heater for an anticipating type of room thermostat, the heater being comparatively simple and inexpensive as well as durable.

A further object is to provide an anticipating room thermostat heater unit readily connectible with terminals of a room thermostat of the type shown for instance in my co-pending application Serial No. 744,156, filed September 15, 1934, now Patent #2,040,404, issued May 12, 1936, the heater being variable in effect so that one heater can be used for all different installations. In this connection it may be mentioned that anticipating room thermostats must be designed for use with all types and sizes of fuel burners. Fuel burners have different ratings and consequently require different amounts of electric current for controlling them. Each room thermostat installation of an anticipating type must have the proper size of heater to secure the necessary anticipation feature without over or under anticipation and heretofore it has been customary to provide heater elements of different sizes or capacity, the dealer installing the burner placing the proper one in a given installation. My present invention contemplates, as one object thereof, the provision of a single heater the effect of which can be varied by connecting more or less of the heater wire in circuit.

With these and other objects in view my invention consists in the construction, arrangement and combination of the various parts of my device, whereby the objects contemplated are attained, as hereinafter more fully set forth, pointed out in my claims and illustrated in the accompanying drawing, in which:

Figure 1 is a front elevation of a room thermostate showing my variable anticipator unit installed therein.

Figure 2 is a sectional view on the line 2—2 of Figure 1 showing the relation of the heater to the temperature responsive element or room thermostat.

Figure 3 is a detail sectional view on the line 3—3 of Figure 1 showing the heater unit only.

Figure 4 is a bottom plan view of the heater unit only.

Figure 5 is a sectional view on the line 5—5 of Figure 4; and

Figure 6 is an electro-diagrammatic view showing the room thermostat and my anticipating heater in a burner circuit.

On the accompanying drawing, I have used the reference numeral 10 to indicate a switch casing of a room thermostat. Mounted within the casing 10 is a bimetal element 12 of zig-zag shape anchored at one end by rivets 14 and having an armature 16 secured to its other end. The armature carries a contact 18 cooperable with a contact 20, these contacts being adapted for connection in the circuit of a fuel burner, the motor of which is indicated at M in Figure 6. The room thermostat includes a pair of terminal straps 22 and 24 to which heretofore interchangeable anticipator heating elements have been secured by terminal screws 26 and 28 respectively. My present invention is an anticipating heater unit indicated generally by the character A secured electrically in the circuit and mounted by the terminal screws 26 and 28.

As to the specific construction of the unit A it comprises a core member 30, preferably of insulating material having a pair of plates 32 and 34 riveted thereto by tubular rivets 36 and 38 respectively. The rivets 36 and 38 form terminals through which the screws 26 and 28 extend.

The plates 32 and 34 are held against rotation relative to the rivets 36 and 38 by flanges 40 and 42. An ear 44 (see Figure 4) is also bent over an extension 30a of the core to retain the parts in assembled position. Wound on the core 30 is a resistance wire 46. The ends thereof, indicated at 48 and 50, are soldered to terminal lugs 52 and 54 formed on the plates 32 and 34 respectively.

A short circuiting lever 56 is provided having one end pivotally mounted by a rivet 58 on the plate 32 and its other end carrying a contact button 60 for contact with the resistance wire 46. The lever 56 can be swung for cutting out more or less of the resistance wire.

Suitable indicia such as 1, 2, 3, 4 and 5 "shorter" and "longer" are provided on the plate 32 for convenience of the person installing the room thermostat. "Shorter" refers to shorter periods of operation or, in other words, a greater degree of anticipation and likewise "longer" refers to a lesser degree of anticipation which can be determined by actually operating the burner after the room thermostat is installed and noting its periods of operation.

Initially, of course, the lever 56 is set at the proper point, depending on the current consumption of the particular installation. This is much easier to accomplish than by changing the heater element as has been done heretofore.

Also after the burner has been in operation, the degree of anticipation can be changed by merely shifting the lever 56 without having to remove a heater element and install another one of a different capacity.

The end 48 of the resistance wire 46 need not necessarily be connected with the plate 32 as any wire between the button 60 and the terminal lug 52 is shorted out of the circuit. However, I prefer such a connection so that if the button 60 becomes dirty and does not let the current pass through, the burner can still operate although the degree of anticipation will be thrown off and of course have to be corrected. Until such time as it is corrected, however, the burner can continue to operate.

Some changes may be made in the construction and arrangement of the parts of my device without departing from the real spirit and purpose of my invention and it is my intention to cover by my claims any modified forms of structure or use of mechanical equivalents, which may be reasonably included within their scope.

I claim as my invention:

1. An anticipating room thermostat comprising a temperature responsive element, contacts controlled thereby, a pair of terminals in series circuit with said contacts and an anticipating heater for said temperature responsive element comprising an insulating member, a heating element wound thereon, a pair of terminal plates, tubular rivets for connecting said terminal plates to said insulating member with the terminal plates spaced relative to each other, said tubular rivets being spaced a distance equal to the distance between said terminals and adapted to receive them, one end of said heating element being connected to one of said terminal plates and a contact lever pivoted to the other of said terminal plates and selectively coactable with the turns of said heating element.

2. An anticipating room thermostat comprising a temperature responsive element, contacts controlled thereby, a pair of terminals in series circuit with said contacts and an anticipating heater for said temperature responsive element comprising an insulating member, a heating element wound thereon, a pair of terminal plates, tubular rivets for connecting said terminal plates to said insulating member with the terminal plates spaced relative to each other, said tubular rivets being spaced a distance equal to the distance between said terminals and adapted to receive them, the ends of said heating element being connected to said terminal plates and a contact lever pivoted to one of said terminal plates and selectively coactable with the turns of said heating element.

3. An anticipating room thermostat comprising a temperature responsive element, contacts controlled thereby, a pair of terminals in series circuit with said contacts and an anticipating heater for said temperature responsive element comprising an insulating member, a heating element wound thereon, a pair of terminal plates, tubular rivets for connecting said terminal plates to said insulating member with the terminal plates spaced relative to each other, said tubular rivets being spaced a distance equal to the distance between said terminals and adapted to receive them, one of said terminal plates having an extension toward the other one, said insulating member having an extension adjacent said other one, means for connecting said extensions together, one end of said heating element being connected to one of said terminal plates and a contact lever pivoted to the other of said terminal plates and selectively coactable with the turns of said heating element.

LAWRENCE M. PERSONS.